United States Patent
Shimazu et al.

(10) Patent No.: US 12,189,201 B2
(45) Date of Patent: Jan. 7, 2025

(54) OPTICAL CABLE TERMINATION UNIT

(71) Applicants: SUMITOMO ELECTRIC INDUSTRIES, LTD., Osaka (JP); SUMITOMO ELECTRIC OPTIFRONTIER CO., LTD., Yokohama (JP)

(72) Inventors: Takayuki Shimazu, Osaka (JP); Shinji Yamane, Yokohama (JP)

(73) Assignees: SUMITOMO ELECTRIC INDUSTRIES, LTD., Osaka (JP); SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 9 days.

(21) Appl. No.: 17/849,965

(22) Filed: Jun. 27, 2022

(65) Prior Publication Data
US 2023/0003958 A1 Jan. 5, 2023

(30) Foreign Application Priority Data
Jun. 30, 2021 (JP) ................. 2021-108780

(51) Int. Cl.
G02B 6/44 (2006.01)
(52) U.S. Cl.
CPC ........... G02B 6/4403 (2013.01); G02B 6/443 (2013.01); G02B 6/4454 (2013.01)
(58) Field of Classification Search
CPC ..... G02B 6/4403; G02B 6/443; G02B 6/4454
USPC .......................................... 385/76
See application file for complete search history.

(56) References Cited

U.S. PATENT DOCUMENTS

| 11,828,996 B2* | 11/2023 | Iwaguchi ............. C03C 25/105 |
| 2018/0129008 A1 | 5/2018 | Gonzalez Covarrubias et al. |
| 2019/0064465 A1 | 2/2019 | Yamauchi et al. |
| 2022/0120989 A1* | 4/2022 | Takeuchi ............. H04B 10/801 |

FOREIGN PATENT DOCUMENTS

| JP | 2003-029055 A | 1/2003 |
| JP | 2004-361893 A | 12/2004 |
| JP | 2009-258244 A | 11/2009 |
| JP | 2019-039978 A | 3/2019 |

* cited by examiner

Primary Examiner — Jerry M Blevins
(74) Attorney, Agent, or Firm — Oliff PLC

(57) ABSTRACT

An optical cable termination unit includes a case, a first adapter panel that is disposed in the case and includes a plurality of first adapters each configured so that a corresponding one of a plurality of optical connectors is connectable thereto and disconnectable therefrom and a first surface on which the plurality of first adapters are arranged, and a second adapter panel that is disposed in the case and includes a plurality of second adapters each configured so that a corresponding one of a plurality of optical connectors is connectable thereto and disconnectable therefrom and a second surface on which the plurality of second adapters are arranged. The first and second surfaces are separated from each other. The first adapter panel is configured to be movable relative to the second adapter panel so that the first surface and the second surface are capable of becoming parallel to each other.

14 Claims, 10 Drawing Sheets

OPTICAL CABLE TERMINATION UNIT

CROSS REFERENCE TO RELATED APPLICATIONS

This application claims priority based on Japanese Patent Application No. 2021-108780 filed on Jun. 30, 2021, and the entire contents of which are incorporated herein by reference.

TECHNICAL FIELD

The present disclosure relates to an optical cable termination unit.

BACKGROUND

A plurality of termination units mounted in an optical wiring rack are known. Each of the termination units includes an adapter panel that is disposed on a front surface and to which a plurality of adapters to be each connected to a plurality of optical connectors are attached, and an opening that is provided on a back surface or a side surface and through which an optical cable passes from the outside (for example, PTL 1: Japanese Patent Laid-Open No. 2003-029055, PTL 2: Japanese Patent Laid-Open No. 2004-361893, PTL 3: Japanese Patent Laid-Open No. 2009-258244, PTL 4: U.S. Patent Application Publication No. 2018/129008, and PTL 5: Japanese Patent Laid-Open No. 2019-039978).

SUMMARY

An optical cable termination unit according to the present disclosure includes a case, a first adapter panel that is disposed in the case and includes a plurality of first adapters each configured so that a corresponding one of a plurality of optical connectors is connectable thereto and disconnectable therefrom and a first surface on which the plurality of first adapters are arranged, and a second adapter panel that is disposed in the case and includes a plurality of second adapters each configured so that a corresponding one of a plurality of optical connectors is connectable thereto and disconnectable therefrom and a second surface on which the plurality of second adapters are arranged. In the optical cable termination unit, the first surface and the second surface are separated from each other. The first adapter panel is configured to be movable relative to the second adapter panel so that the first surface and the second surface are capable of becoming parallel to each other.

An optical cable termination unit according to the present disclosure includes a case having an opening and a cable introducing portion configured to guide an optical cable from an outside to the opening of the case. In the optical cable termination unit, the cable introducing portion is supported by an outer surface of the case via a shaft and is configured to rotate around the shaft between a first position in which the cable introducing portion faces the opening and a second position in which the cable introducing portion is further separated from the opening than in the first position.

DETAILED DESCRIPTION

Figure 1:
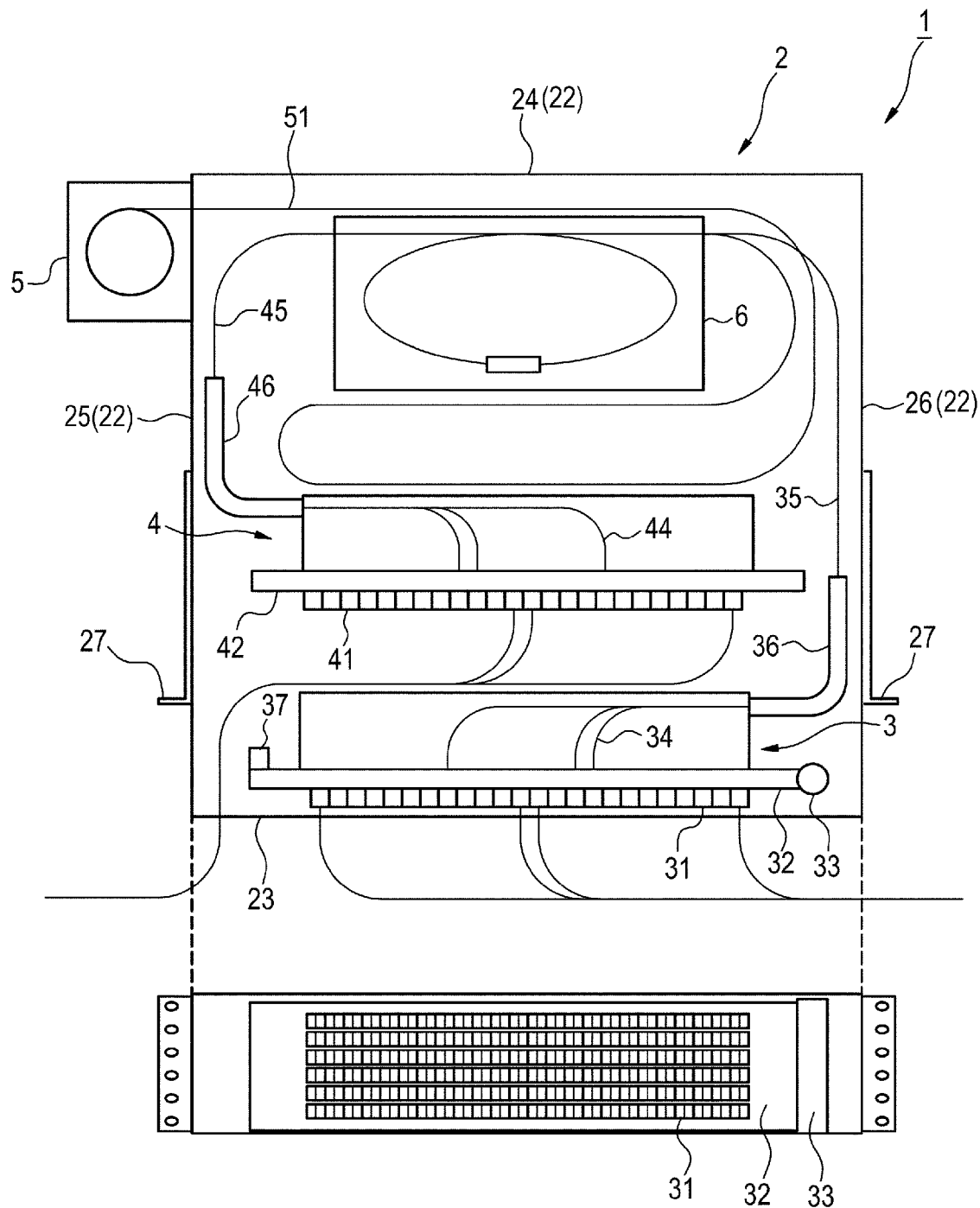
FIG. 1 is a front view of an optical cable termination unit according to an embodiment of the present disclosure and a plan view illustrating the inside thereof.

The size and shape of a termination unit are restricted by a housing portion of an optical wiring rack in which the termination unit is to be mounted. It is not easy to connect and disconnect a plurality of optical connectors, which are led from the outside, to and from a corresponding one of a plurality of adapters in a limited and narrow space or to properly wire optical cables, which are led from the outside, inside the case. Therefore, it is desirable to secure a work space.

Further, in order to handle a large volume of information, it is desirable that the termination unit includes a large number of adapters to be connected to the optical connectors. However, there is a limit to the number of adapters that can be arranged in a limited space. For example, Patent Literatures PTL 1 to PTL 4 disclose termination units each including an adapter panel in which a plurality of optical connectors are arranged and which moves relative to a case. Since the adapter panel moves relative to the case, a work space is secured, but the number of optical connectors that can be mounted in the panel is limited.

In addition, when an optical cable is introduced into the termination unit from the outside, it is difficult to properly guide and wire the optical cable into a limited space. Patent Literature PTL 5 discloses a termination unit including a fixing member that is slidably and rotatably attached to one side surface of the termination unit and fixes a multi-core cable. Since the fixing member is slidably and rotatably movable with respect to the termination unit, a user can move the optical cable fixed to the fixing member to a predetermined position as necessary, but more flexibility is desired in the position and movable range of the fixing member with respect to the case of the termination unit.

An object of the present disclosure is to provide an optical cable termination unit that facilitates connection and disconnection of optical connectors and wiring of optical cables.

DESCRIPTION OF EMBODIMENTS OF THE PRESENT DISCLOSURE

First, the contents of embodiments of the present disclosure will be listed and described.

(1) A optical cable termination unit according to an embodiment of the present disclosure includes a case, a first adapter panel that is disposed in the case and includes a plurality of first adapters each configured so that a corresponding one of a plurality of optical connectors is connectable thereto and disconnectable therefrom and a first surface on which the plurality of first adapters are arranged, and a second adapter panel that is disposed in the case and includes a plurality of second adapters each configured so that a corresponding one of a plurality of optical connectors is connectable thereto and disconnectable therefrom and a second surface on which the plurality of second adapters are arranged. In the optical cable termination unit, the first surface and the second surface are separated from each other. The first adapter panel is configured to be movable relative to the second adapter panel so that the first surface and the second surface are capable of becoming parallel to each other.

Since the termination unit according to the present disclosure includes a plurality of adapter panels such as the first adapter panel and the second adapter panel, the termination unit can include a large number of adapters connectable to the optical connectors. Since the first surface of the first adapter panel and the second surface of the second adapter panel are separated from each other and arranged in parallel with each other, the first adapter panel and the second adapter panel can be effectively arranged in a limited space of the termination unit. Further, the first adapter panel is configured to be movable relative to the second adapter panel. Therefore, when connecting and disconnecting the optical connectors to and from the second adapters, a user can keep the first adapter panel away from the second adapter panel to secure a work space. Therefore, the optical connectors can be easily connected and disconnected.

(2) The first adapter panel may be supported by the case via a first shaft. The first adapter panel may be configured to rotate relative to the second adapter panel around the first shaft. According to the present disclosure, the first adapter panel is configured to rotate relative to the second adapter panel around the first shaft. Therefore, when connecting and disconnecting the optical connectors to and from second adapters, a user can secure a space between the first adapter panel and the second adapter panel by rotating the first adapter panel. Therefore, the optical connectors can be easily connected and disconnected.

(3) The termination unit may include a support body that is disposed in the case and configured to slide with respect to the case. At least one of the first adapter panel or the second adapter panel may be supported by the support body. According to the present disclosure, since at least one of the first adapter panel or the second adapter panel is supported by the support body, a user can easily expose or house the first adapter panel or the second adapter panel from or in the case by sliding the support body with respect to the case. Therefore, the optical connectors can be easily connected and disconnected.

(4) The first adapter panel may include a third adapter panel including some of the plurality of first adapters, and a fourth adapter panel including the others of the plurality of first adapters. The third adapter panel may be supported by the case via a third shaft disposed at one end of the first adapter panel. The third adapter panel may be configured to rotate relative to the fourth adapter panel around the third shaft. The fourth adapter panel may be supported by the case via a fourth shaft disposed at the other end of the first adapter panel. The fourth adapter panel may be configured to rotate relative to the third adapter panel around the fourth shaft.

According to the present disclosure, the third adapter panel and the fourth adapter panel are configured to rotate relative to each other. Therefore, a user can rotate only the third adapter panel without rotating the fourth adapter panel, for example, to secure a space between the third adapter panel and the second adapter panel. In this case, as compared with a case where the entire first adapter panel including the third adapter panel and the fourth adapter panel is rotated, a work space is secured with a minimum necessary operation, which improves work efficiency.

(5) The second adapter panel may be supported by the case via a second shaft. The second adapter panel may be configured to rotate relative to the first adapter panel around the second shaft. According to the present disclosure, since not only the first adapter panel but also the second adapter panel is configured to rotate, flexibility of securing the work space is increased.

(6) A plurality of cables with first connectors may be each connected to a corresponding one of the plurality of first adapters. A plurality of cables with second connectors may be each connected to a corresponding one of the plurality of second adapters. According to the present disclosure, the cables with the first connectors are each connected to a corresponding one of the first adapters. The cables with the second connectors are each connected to a corresponding one of second adapters. This allows a user to facilitate connecting the optical connectors.

(7) Each of the cables with the first connectors may include an optical fiber or an optical fiber ribbon. Each of the cables with the second connectors may include an optical fiber or an optical fiber ribbon. A cable portion of the plurality of cables with the first connectors may be covered by a protective member. A cable portion of the plurality of cables with the second connectors may be covered by a protective member. According to the present disclosure, each of the cables with the first connectors includes an optical fiber or an optical fiber ribbon, and each of the cables with the second connectors includes an optical fiber or an optical fiber ribbon. Therefore, the termination unit according to the present disclosure can be connected to various optical fibers. In addition, since the cable portion of the cables with the first connectors and the cable portion of the cables with the second connectors are covered by the protective member, damage to both of the cable portions can be prevented.

(8) Each of the cables with the first connectors may include an optical fiber having an outside diameter from 200 μm to 250 μm. Each of the cables with the second connectors may include an optical fiber having an outside diameter of 200 μm to 250 μm. The first adapter panel and the second adapter panel of the termination unit according to the present disclosure can be connected to an optical fiber having an outside diameter of 200 μm to 250 μm.

(9) An optical cable termination unit according to another embodiment of the present disclosure includes a case having an opening, and a cable introducing portion that is configured to guide an optical cable from an outside to the opening of the case. The cable introducing portion is supported by an outer surface of the case via a shaft and is configured to rotate around the shaft between a first position in which the cable introducing portion faces the opening and a second position in which the cable introducing portion is further separated from the opening than in the first position.

According to the present disclosure, the cable introducing portion is configured to rotate around the shaft between the first position and the second position. Therefore, when a user introduces the optical cable into the termination unit, a space between the case and the cable introducing portion can be expanded as a work space by rotating the cable introducing portion. This allows a user to facilitate wiring the optical cable.

(10) The outer surface may include a first side surface and a second side surface that form the case. The first side surface and the second side surface may face each other and may intersect a surface including the opening. The cable introducing portion may be configured to be supported by both of the first side surface and the second side surface via the shaft. The cable introducing portion may be attached to the first side surface (for example, left side surface) of the case or may be attached to the second side surface (for example, right side surface) of the case, in accordance with a housing portion of an optical wiring rack to be mounted. According to the present disclosure, since the cable introducing portion is configured to be supported by both of the first side surface and the second side surface, flexibility of disposed position of the cable introducing portion with respect to the case is increased.

(11) The termination unit may include a bracket that is attached to the outer surface of the case and includes the shaft. The cable introducing portion may be attached to the bracket. Depending on the sizes and shapes of the case and the cable introducing portion in the termination unit, attachment of the cable introducing portion to the case of the termination unit may be restricted. However, according to the present disclosure, the cable introducing portion is attached to the case of the termination unit via the bracket. Therefore, by changing the size and shape of the bracket, the cable introducing portion can be attached to the case without changing the configurations of the cable introducing portion and the case of the termination unit. Therefore, flexibility of disposed position of the cable introducing portion is increased.

(12) The bracket may be slidably attached to the outer surface of the case. According to the present disclosure, since the bracket is slidably attached to the outer surface of the case, a user can move the cable introducing portion attached to the bracket relative to the case. Therefore, a space between the case and the cable introducing portion can be expanded as a work space, and working efficiency is improved. Details of Embodiments of the present disclosure Specific examples of an optical cable termination unit according to an embodiment of the present disclosure will be described with reference to the drawings. The present disclosure is not limited to the following examples, and is defined by claims, and is intended to embrace all the modifications within the meaning and range of equivalency of the claims.

FIG. 1 is a front view of an optical cable termination unit 1 according to an embodiment of the present disclosure and a plan view illustrating the inside thereof. As illustrated in FIG. 1, the termination unit 1 includes a case 2, a first adapter panel 3, a second adapter panel 4, a cable introducing portion 5, and a splice tray 6.

The case 2 includes an outer surface 22 that forms the case 2. The outer surface 22 has a back surface 24, a left side surface 25, a right side surface 26, and a bottom surface. Each of the back surface 24, the left side surface 25, the right side surface 26, and the bottom surface is formed of a plate member. The case 2 further includes a front surface 23 that opens forward. The front surface 23 and the back surface 24 are configured to face each other. The left side surface 25 and the right side surface 26 are configured to face each other and to intersect at least the back surface 24. The left side surface 25 is an example of a first side surface. The right side surface 26 is an example of a second side surface.

A rack-mount bracket 27 may be provided on each of the left side surface 25 and the right side surface 26. The termination unit 1 of the present embodiment is supported by and mounted in an optical wiring rack (not illustrated) via the rack-mount bracket 27. The termination unit 1 may be directly supported by and mounted in the optical wiring rack without the rack-mount bracket 27.

The first adapter panel 3 is disposed in the case 2 at a position closer to the front surface 23 of the case 2 than the second adapter panel 4. The first adapter panel 3 includes a plurality of first adapters 31 each configured so that a corresponding one of a plurality of optical connectors is connectable thereto and disconnectable therefrom, a first adapter surface 32 on which the plurality of the first adapters 31 are arranged, and a first shaft 33. A plurality of cables with first connectors 34 are each connected to a corresponding one of the plurality of the first adapters 31. A cable portion 35, a protective member 36, and a stopper 37 are disposed on a back surface side of the first adapter panel 3. The first adapter surface 32 is an example of a first surface.

Each of the first adapters 31 is, for example, an adapter configured to be connected to an LC connector. On the first adapter surface 32 of the present embodiment, the 288 first adapters 31 are arranged. Each of cables with the first connectors 34 includes an optical fiber or an optical fiber ribbon. An outside diameter of the optical fiber is, for example, from 200 µm to 250 µm. The optical fiber ribbon is, for example, a 12-core intermittent connection type optical fiber ribbon. The plurality of cables with the first connectors 34 are bundled on the back surface side and led to the splice tray 6 as the cable portion 35. At least a part of the cable portion 35 is covered with the protective member 36. The cable portion 35 and the first shaft 33 of the present embodiment are both disposed at the other end (right end in the present embodiment) of the first adapter panel 3 and at a position close to the other side surface (the right side surface 26 in the present embodiment) of the case 2. The stopper 37 in the present embodiment is disposed at a position close to one side surface (the left side surface 25 in the present embodiment) of the case 2.

The first adapter panel 3 is supported by the case 2 via the first shaft 33. The first adapter panel 3 is configured to be movable relative to the second adapter panel 4. Here, "movable relative to the second adapter panel 4" means that the first adapter panel 3 can move in parallel or rotationally relative to the second adapter panel 4 in a front-back direction of the case 2. The first adapter panel 3 in the present embodiment is configured to rotate relative to the second adapter panel 4 around the first shaft 33. More specifically, a left end of the first adapter panel 3 rotates so as to be close to or away from the second adapter panel 4 around the first shaft 33 disposed at the right end of the first adapter panel 3.

The second adapter panel 4 is disposed in the case 2 at a position closer to the back surface 24 of the case 2 than the first adapter panel 3. The second adapter panel 4 of the present embodiment is fixed between the first adapter panel 3 and the splice tray 6. The second adapter panel 4 includes a plurality of second adapters 41 each configured so that a corresponding one of a plurality of optical connectors is connectable thereto and disconnectable therefrom, and a second adapter surface 42 on which the plurality of the second adapters 41 are arranged. A plurality of cables with second connectors 44 are each connected to a corresponding one of the plurality of the second adapters 41. A cable portion 45 and a protective member 46 are disposed on a back surface side of the second adapter panel 4. The second adapter surface 42 is an example of a second surface.

Each of the second adapters 41 is, for example, an adapter configured to be connected to an LC connector. On the second adapter surface 42 of the present embodiment, the 288 second adapters 41 are arranged. Each of cables with the second connectors 44 includes an optical fiber or an optical fiber ribbon. An outside diameter of the optical fiber is, for example, from 200 μm to 250 μm. The optical fiber ribbon is, for example, a 12-core intermittent connection type optical fiber ribbon. The plurality of cables with the second connectors 44 are bundled on the back surface side and led to the splice tray 6 as the cable portion 45. At least a part of the cable portion 45 is covered with the protective member 46. The cable portion 45 of the present embodiment is disposed at one end (left end in the present embodiment) of the second adapter panel 4 and at a position close to one side surface (left side surface 27 in the present embodiment) of the case 2.

In the case 2, the first adapter surface 32 and the second adapter surface 42 are separated from each other. Further, in the present embodiment, the first adapter surface 32 and the second adapter surface 42 are configured to be capable of becoming parallel to each other. For example, as illustrated in FIG. 1, in a state in which a distance between the first adapter panel 3 and the second adapter panel 4 is the shortest, the first adapter surface 32 and the second adapter surface 42 are separated from each other and are capable of becoming parallel to each other. In a state in which the first adapter panel 3 is rotated so as to be away from the second adapter panel 4, the first adapter surface 32 and the second adapter surface 42 can be separated from each other, and a direction of the first adapter surface 32 and a direction of the second adapter surface 42 can intersect each other.

The Cable introducing portion 5 is supported by the outer surface 22 of the case 2 and configured to guide an optical cable 51 from the outside to the case 2. The Cable introducing portion 5 in the present embodiment is fixed to the left side surface 25 of the case 2. Note that the position of the cable introducing portion 5 is not limited to the left side surface 25. The Cable introducing portion 5 may be disposed on the back surface 24 or the right side surface 26 in accordance with an optical wiring rack in which the termination unit 1 is to be mounted.

The splice tray 6 is disposed in the case 2 and at a position closer to the back surface 24 of the case 2 than the second adapter panel 4. The splice tray 6 is configured to connect the optical cable 51 led from the cable introducing portion 5, the cable portion 35 of the first adapter panel 3, and the cable portion 45 of the second adapter panel 4. For example, each of cables with the first connectors 34 is led out from the cable portion 35 of the first adapter panel 3, and connection portions between cables with the first connectors 34 and optical cables 51 are housed in the splice tray 6. Alternatively, each of cables with second connector 44 is led out from the cable portion 45 of the second adapter panel 4, and connection portions between cables with the second connectors 44 and optical cables 51 are housed in the splice tray 6.

Figure 2:
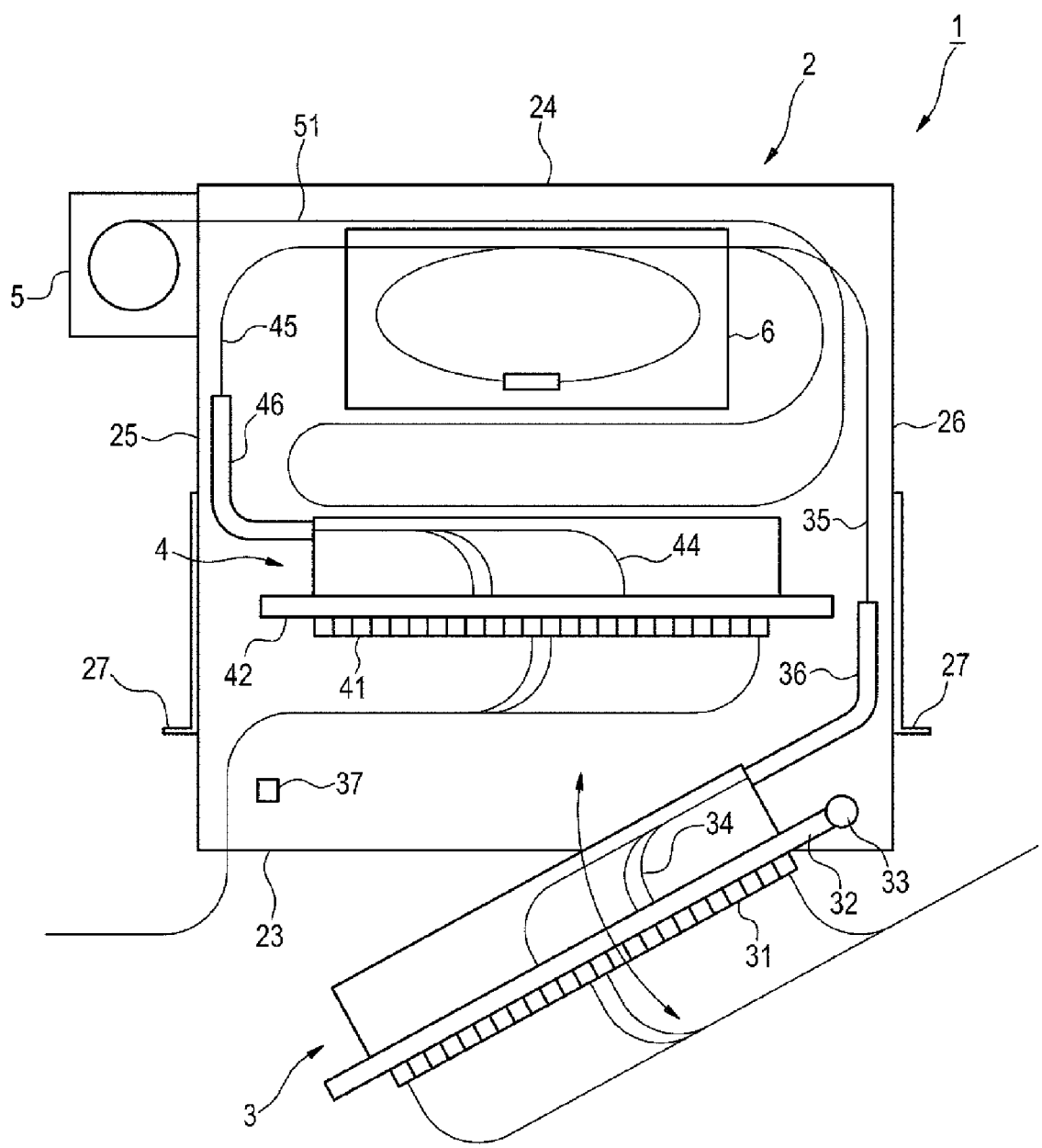
FIG. 2 is a plan view of a termination unit when a first adapter panel of the termination unit has moved.

Next, a method of using the termination unit 1 according to the present embodiment will be described. FIG. 2 is a plan view of the termination unit 1 when the first adapter panel 3 has moved relative to the second adapter panel 4.

As illustrated in FIG. 2, at least a part of the first adapter panel 3 can be rotated around the first shaft 33 so as to be away from the second adapter panel 4 in a front direction. In the present embodiment, the first adapter panel 3 is configured so that the left end of the first adapter panel 3 is away from the second adapter panel 4 in the front direction by rotating the first adapter panel 3 around the first shaft 33 from a state in which the first adapter panel 3 and the second adapter panel 4 are parallel to each other. In this way, a space between the first adapter panel 3 and the second adapter panel 4 is expanded, and a work space is secured.

The first adapter panel 3 is configured so that the left end of the first adapter panel 3 abuts against the stopper 37 when the first adapter panel 3 rotates backward so that the left end of the first adapter panel 3 becomes close to the second adapter panel 4. This configuration prevents the first adapter panel 3 from contacting the second adapter panel 4 or the connectors connected to the second adapters 41. A user can connect and disconnect each of optical connectors to and from a corresponding one of the first adapters 31 of the first adapter panel 3 from a front right side, and can connect and disconnect each of optical connectors to and from a corresponding one of the second adapters 41 of the second adapter panel 4 from a front left side.

As described above, the termination unit 1 according to the present embodiment includes both the first adapter panel 3 and the second adapter panel 4. In particular, in the termination unit 1 of the present embodiment, the first adapter surface 32 of the first adapter panel 3 and the second adapter surface 42 of the second adapter panel 4 are configured to be separated from each other and to be capable of becoming parallel to each other. Therefore, the termination unit 1 can effectively house a plurality of adapter panels in a limited space. In addition, since the termination unit 1 includes more adapters connectable to a plurality of optical connectors, the termination unit 1 can handle a large volume of information as compared with a termination unit having a single adapter panel.

The first adapter panel 3 of the present embodiment is configured to be movable relative to the second adapter panel 4. Therefore, when connecting and disconnecting optical connectors to and from the second adapters 41, a user can secure a work space by moving a part of the first adapter panel 3 away from the second adapter panel 4. Therefore, the first adapter panel 3 does not hinder connection and disconnection of optical connectors to and from the second adapter panel 4, and thus the optical connectors can be easily connected and disconnected.

In particular, in this embodiment, at least a part of the first adapter panel 3 is configured to rotate relative to the second adapter panel 4 around the first shaft 33. Therefore, a user can secure a space between the first adapter panel 3 and the second adapter panel 4 by rotating the first adapter panel 3. Therefore, the optical connectors can be easily connected and disconnected.

In this embodiment, cables with the first connectors 34 are each connected to a corresponding one of the first adapters 31, and cables with the second connectors 44 are each connected to a corresponding one of the second adapters 41. This allows a user to easily connect and disconnect the optical connectors.

In this embodiment, each of cables with the first connectors 34 includes an optical fiber or an optical fiber ribbon, and each of cables with the second connectors 44 includes an optical fiber or an optical fiber ribbon. Therefore, the termination unit 1 in this embodiment can be easily connected to various optical fibers. Thus, convenience is improved.

The cable portion 35 of cables with the first connectors 34 is covered with the protective member 36, and the cable portion 45 of cables with the second connectors 44 is covered with the protective member 46. Therefore, even when the first adapter panel 3 and the second adapter panel 4 are moved relative to each other, damage to both of the cable portions can be prevented, and the optical connectors can be easily connected and disconnected in the termination unit 1.

In this embodiment, the first shaft 33 and the cable portion 35 of cables with the first connectors 34 are both disposed at the right end of the first adapter panel 3 and at a position close to the right side surface 26 of the case 2. In other words, even when the left end of the first adapter panel 3 is rotated relative to the second adapter panel 4, the cable portion 35 is located at the right end of the first adapter panel 3, and a wide work space is secured between the first adapter panel 3 and the second adapter panel 4. Since the cable portion 35 is not in a work space, the optical connectors can be easily connected and disconnected.

Each of cables with the first connectors 34 includes an optical fiber having an outside diameter of 200 μm to 250 μm. Each of cables with the second connectors 44 includes an optical fiber having an outside diameter of 200 μm to 250 μm. Therefore, the termination unit 1 of the present embodiment can be connected to an optical fiber having an outside diameter of 200 μm to 250 μm, and versatility is enhanced.

A movement of the first adapter panel 3 relative to the second adapter panel 4 is not limited to rotation. First adapter panel 3 may be configured to slide relative to the second adapter panel 4. More specifically, from a state in which the first adapter panel 3 and the second adapter panel 4 are parallel to each other, the entire the first adapter panel 3 may slide so as to be away from the second adapter panel 4 to protrude from the front surface 23 of the case 2. By sliding the entire the first adapter panel 3, a space between the first adapter panel 3 and the second adapter panel 4 is expanded. Thus, the optical connectors can be easily connected and disconnected to and from the plurality of the second adapters 41.

The cable portion 35 and the first shaft 33 may be disposed at one end of the first adapter panel 3 and at a position close to the left side surface 25 of the case 2. In this case, the right end of the first adapter panel 3 rotates so as to be close to or away from the second adapter panel 4 around the first shaft 33 disposed at the left end of the first adapter panel 3. A user can connect and disconnect each of optical connectors to and from a corresponding one of the first adapters 31 of the first adapter panel 3 from the front left side, and can connect and disconnect each of optical connectors to and from a corresponding one of the second adapters 41 of the second adapter panel 4 from the front right side. In addition, the cable portion 35 does not interfere with a work space between the first adapter panel 3 and the second adapter panel 4, thereby facilitating connection and disconnection of the optical connectors.

Figure 3:
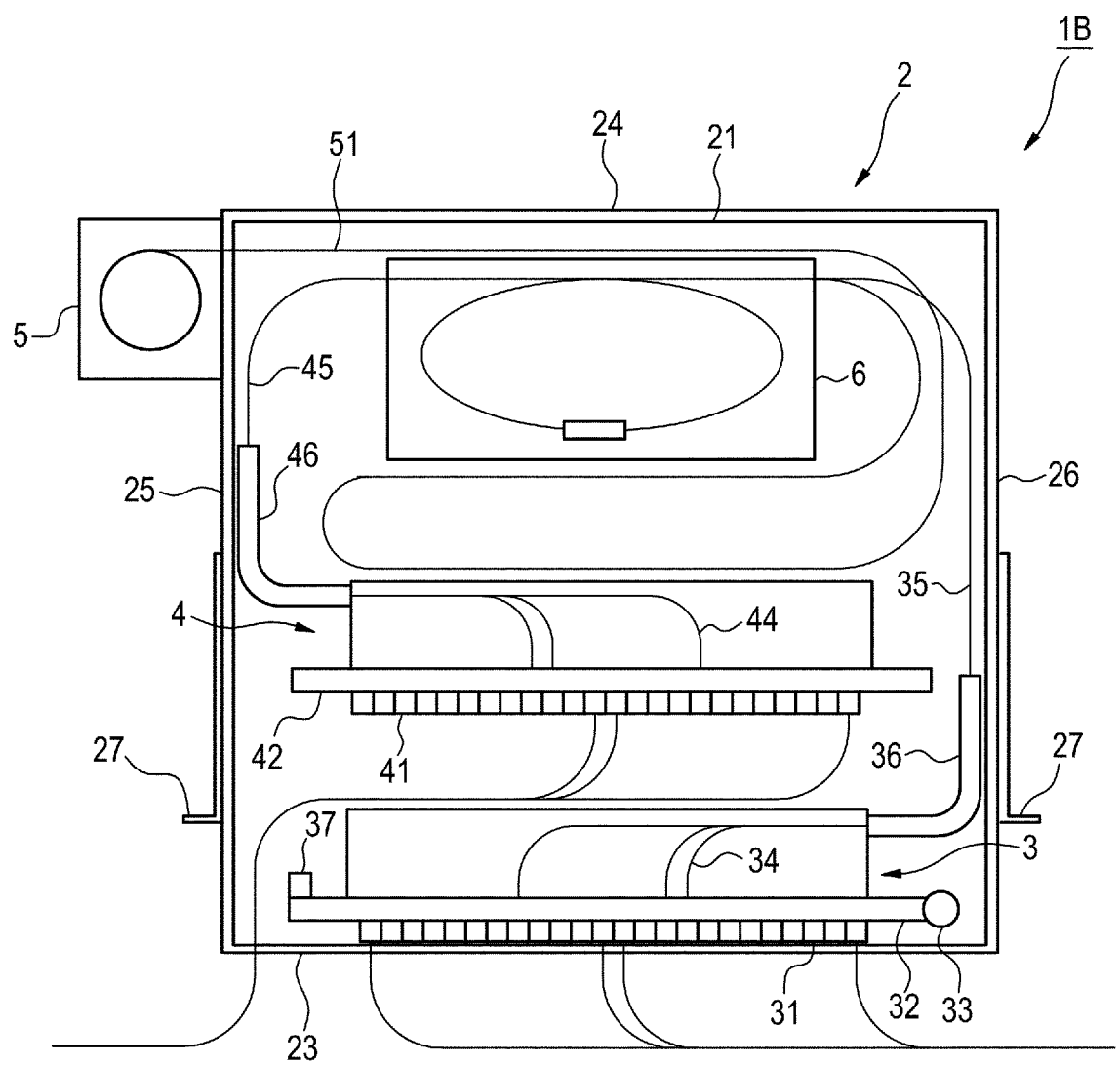
FIG. 3 is a plan view of a termination unit including an inner chassis.

The termination unit 1 may include an inner chassis 21. FIG. 3 is a plan view illustrating the inside of a termination unit 1B including the inner chassis 21. Elements that are substantially the same as those of termination unit 1 illustrated in FIG. 1 are denoted by the same reference numerals, and repeated descriptions thereof will be omitted.

As illustrated in FIG. 3, the inner chassis 21 is disposed in the case 2 and is configured to slide with respect to the case 2. The inner chassis 21 is configured to support at least one of the first adapter panel 3 or the second adapter panel 4. For example, the first shaft 33 of the first adapter panel 3 may be fixed to the inner chassis 21, and the first adapter panel 3 may be supported by the case 2 via the first shaft 33 and the inner chassis 21. Similarly, the second adapter panel 4 may be fixed to the inner chassis 21, and the second adapter panel 4 may be supported by the case 2 via the inner chassis 21. The inner chassis 21 of the present embodiment supports both the first adapter panel 3 and the second adapter panel 4. The inner chassis 21 is an example of a support body.

Figure 4:
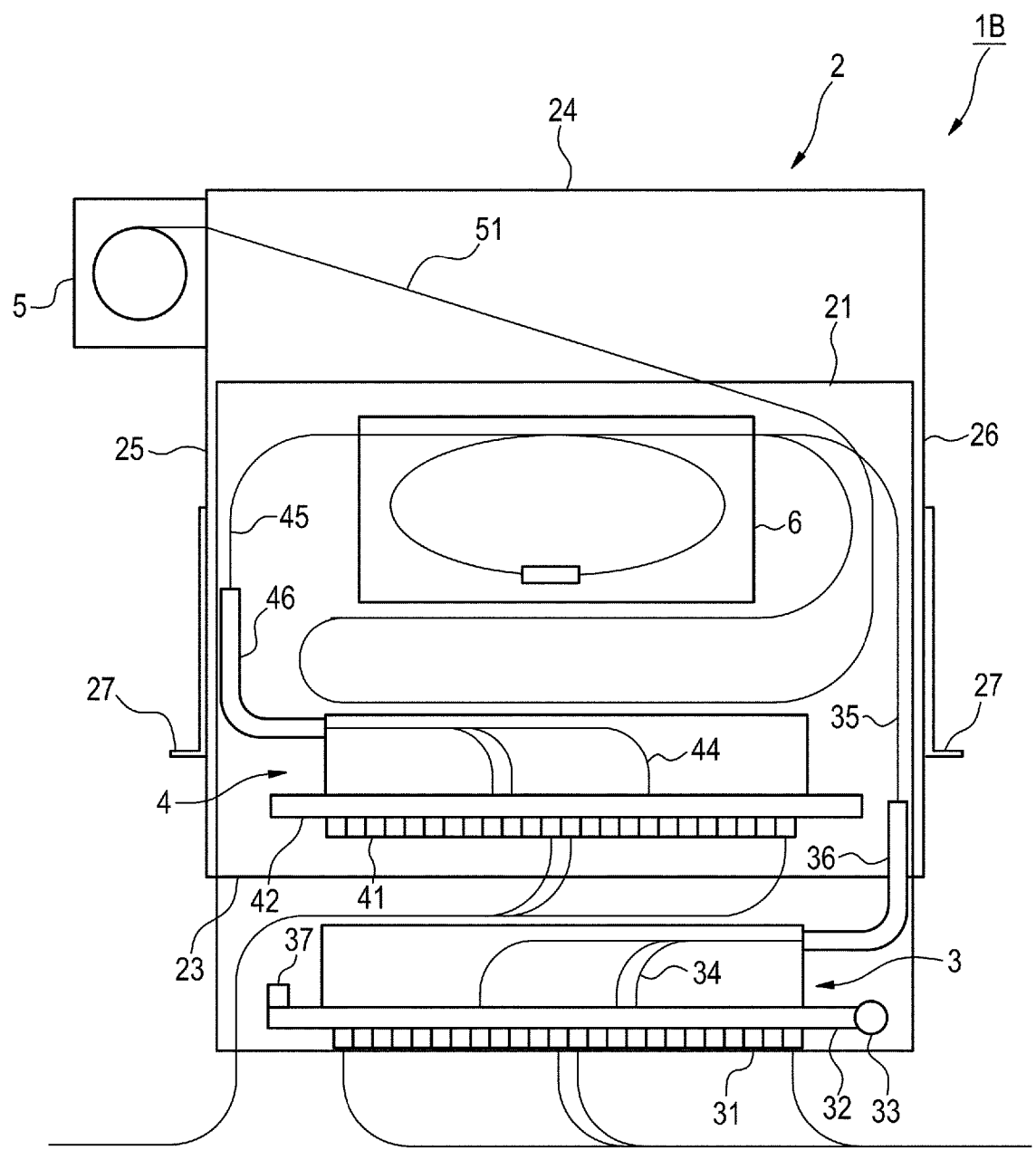
FIG. 4 is a plan view of a termination unit when an inner chassis has moved.

FIG. 4 is a plan view of the termination unit 1B when the inner chassis 21 has slid relative to the case 2. As illustrated in FIG. 4, the inner chassis 21 that supports both the first adapter panel 3 and the second adapter panel 4 can slide so as to protrude from the front surface 23 of the case 2. The inner chassis 21 that supports both the first adapter panel 3 and the second adapter panel 4 may slide so as to protrude from the back surface 24 of the case 2.

As described above, since the inner chassis 21 slides with respect to the case 2, a user can expose the first adapter panel 3 or the second adapter panel 4 from the case 2, or can house the first adapter panel 3 or the second adapter panel 4 in the case 2. In particular, by exposing the first adapter panel 3 or the second adapter panel 4 from the case 2, the user can lead the first adapter panel 3 or the second adapter panel 4 to a relatively wide space outside the case 2 rather than a limited space of the case 2 in the termination unit 1B. Since a work space becomes wider, the optical connectors can be easily connected and disconnected.

Figure 5:
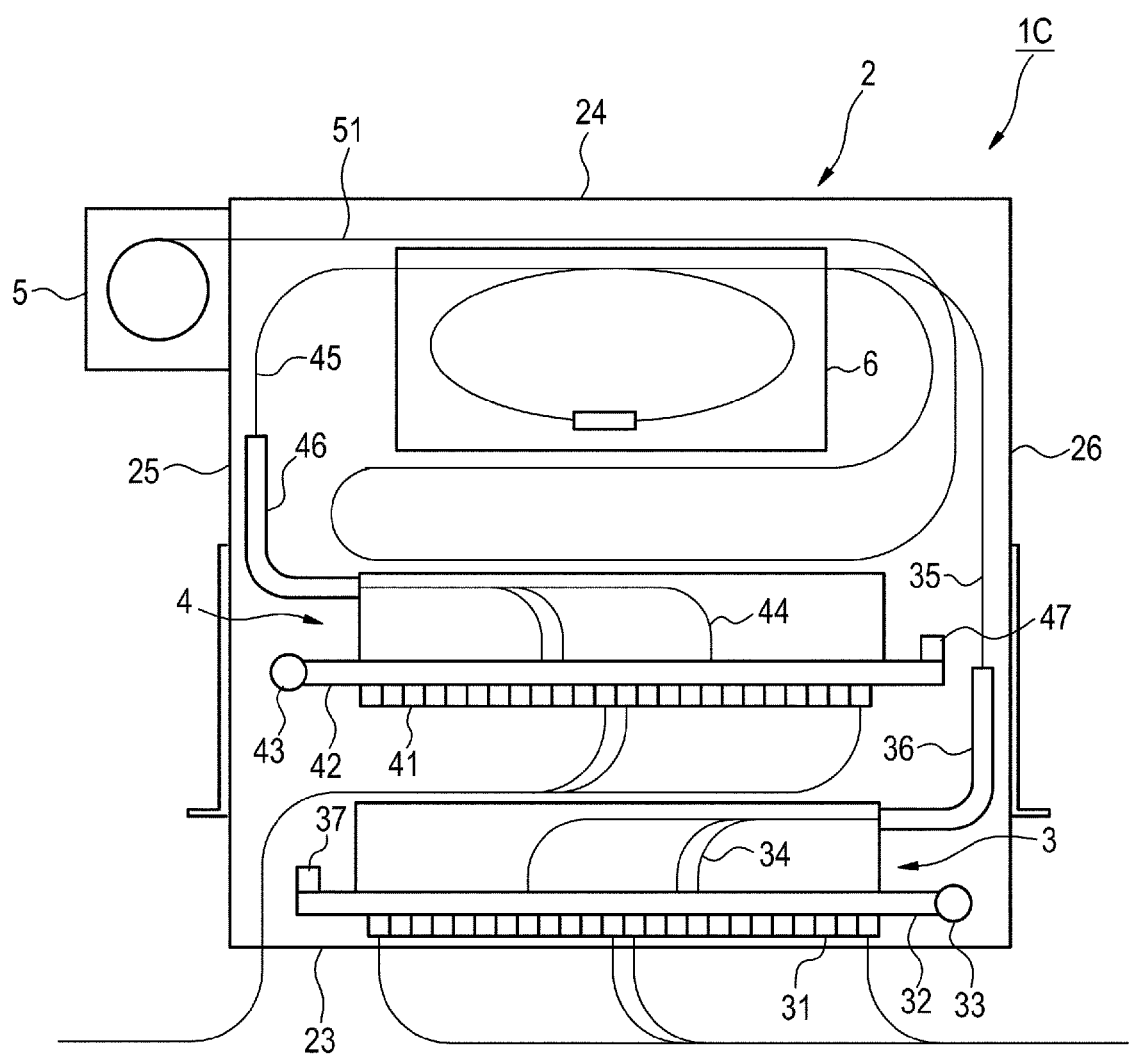
FIG. 5 is a plan view of a termination unit when a second adapter panel of the termination unit rotates.

The second adapter panel 4 may include a second shaft 43. FIG. 5 is a plan view of a termination unit 1C when the second adapter panel 4 includes the second shaft 43. Elements that are substantially the same as those of termination unit 1 illustrated in FIG. 1 are denoted by the same reference numerals, and repeated descriptions thereof will be omitted.

As illustrated in FIG. 5, the second adapter panel 4 includes the second shaft 43 and a stopper 47. Both the second shaft 43 and the cable portion 45 of the present embodiment are disposed at one end (left end in the present embodiment) of the second adapter panel 4 and at a position close to one side surface (the left side surface 25 in the present embodiment) of the case 2. Stopper 47 of this embodiment is disposed at a position close to the other side surface (the right side surface 26 in this embodiment) of the case 2. The second shaft 43 and the cable portion 45 may be disposed at positions close to the other side surface (the right side surface 26). In this case, stopper 47 is disposed at a position close to one side surface (the left side surface 25).

Second adapter panel 4 is supported by the case 2 via the second shaft 43. Second adapter panel 4 is configured to rotate relative to the first adapter panel 3 around the second shaft 43. More specifically, the second adapter panel 4 is configured so that the right end of the second adapter panel 4 rotates so as to be close to or away from the first adapter panel 3 around the second shaft 43 disposed at the left end of the second adapter panel 4.

As described above, in the termination unit 1C of the present embodiment, since the second adapter panel 4 includes the second shaft 43, not only the first adapter panel 3 but also the second adapter panel 4 rotates. Therefore, flexibility of securing work space is increased. By rotating the right end of the second adapter panel 4 forward so as to be close to the front surface 23 of the case 2, a user can easily connect and disconnect the optical connectors to and from the second adapters 41.

Figure 6:
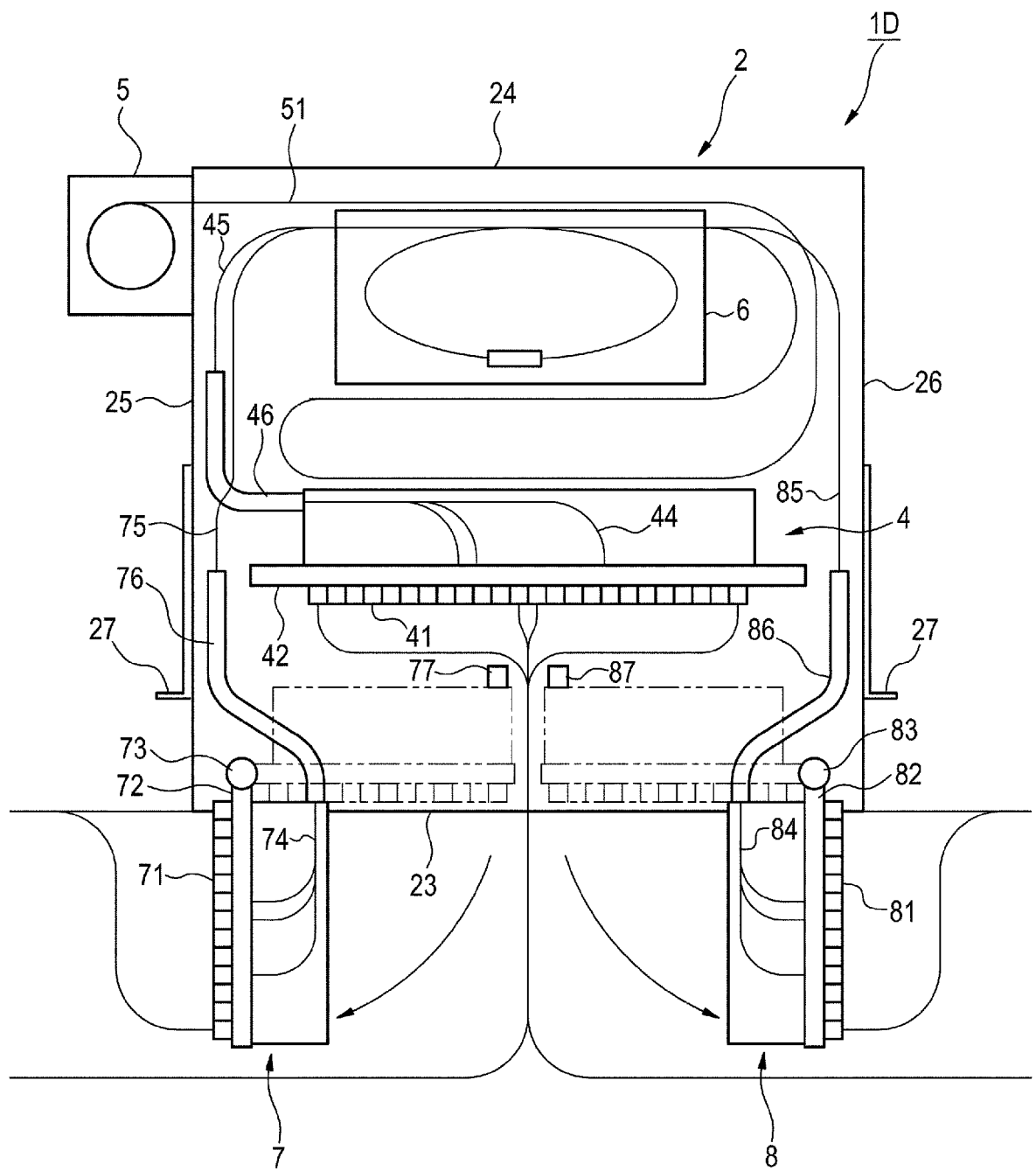
FIG. 6 is a plan view of a termination unit when a first adapter panel of the termination unit is a double-hinged door type.

First adapter panel 3 may include a plurality of adapter panels. FIG. 6 is a plan view of a termination unit 1D when the first adapter panel 3 includes a plurality of adapter panels. Elements that are substantially the same as those of the termination unit 1 illustrated in FIG. 1 are denoted by the same reference numerals, and repeated descriptions thereof will be omitted.

As illustrated in FIG. 6, the first adapter panel 3 includes a third adapter panel 7 including some of the plurality of the first adapters 31, and a fourth adapter panel 8 including the others of the plurality of the first adapters 31.

Third adapter panel 7 includes a plurality of third adapters 71 that are some of the adapters positioned on the left side among the first adapters 31, a third adapter surface 72 on which third adapters 71 are arranged, and a third shaft 73. Third shaft 73 of this embodiment is disposed at one end (left end) of the first adapter panel 3 and at a position close to the left side surface 25 of the case 2. A plurality of cables with third connectors 74 are each connected to a corresponding one of third adapters 71. A cable portion 75, a protective member 76, and a stopper 77 are disposed on a back surface side of third adapter panel 7.

Fourth adapter panel 8 includes a plurality of fourth adapters 81 that are the other adapters positioned on the right side among the first adapters 31, a fourth adapter surface 82 on which fourth adapters 81 are arranged, and a fourth shaft 83. Fourth shaft 83 in this embodiment is disposed at the other end (right end) of the first adapter panel 3 and at a position close to the right side surface 26 of the case 2. A plurality of cables with fourth connectors 84 are each connected to a corresponding one of fourth adapters 81. A cable portion 85, a protective member 86, and a stopper 87 are disposed on a back surface side of fourth adapter panel 8.

Third adapter panel 7 is supported by the case 2 via third shaft 73. Further, third adapter panel 7 is configured to rotate relative to fourth adapter panel 8 around third shaft Fourth adapter panel 8 is supported by the case 2 via fourth shaft 83. Further, fourth adapter panel 8 is configured to rotate relative to third adapter panel 7 around fourth shaft 83. In other words, third adapter panel 7 and fourth adapter panel 8 are double-hinged doors with reference to the center of the first adapter panel 3, and are configured to move toward and away from each other.

By rotating third adapter panel 7 and fourth adapter panel 8, a space between the first adapter panel 3 and the second adapter panel 4 is expanded, and a work space is secured. A user can connect and disconnect each of optical connectors to and from a corresponding one of third adapters 71 of third adapter panel 7 from a front side or a right side, and connect and disconnect each of optical connectors to and from a corresponding one of fourth adapters 81 of fourth adapter panel 8 from the front side or a left side. Further, the user can connect and disconnect each of optical connectors to and from a corresponding one of the second adapters 41 of the second adapter panel 4 from the front side between third adapter panel 7 and fourth adapter panel 8.

As described above, in the termination unit 1D of this embodiment, third adapter panel 7 and fourth adapter panel 8 are configured to rotate relative to each other. Therefore, a user can secure a space between third adapter panel 7 and the second adapter panel 4 by rotating only third adapter panel 7 without rotating fourth adapter panel 8, for example. In this case, as compared with a case where the entire the first adapter panel 3 including third adapter panel 7 and fourth adapter panel 8 is rotated, a work space is secured with a minimum necessary operation, which improves work efficiency.

Figure 7:
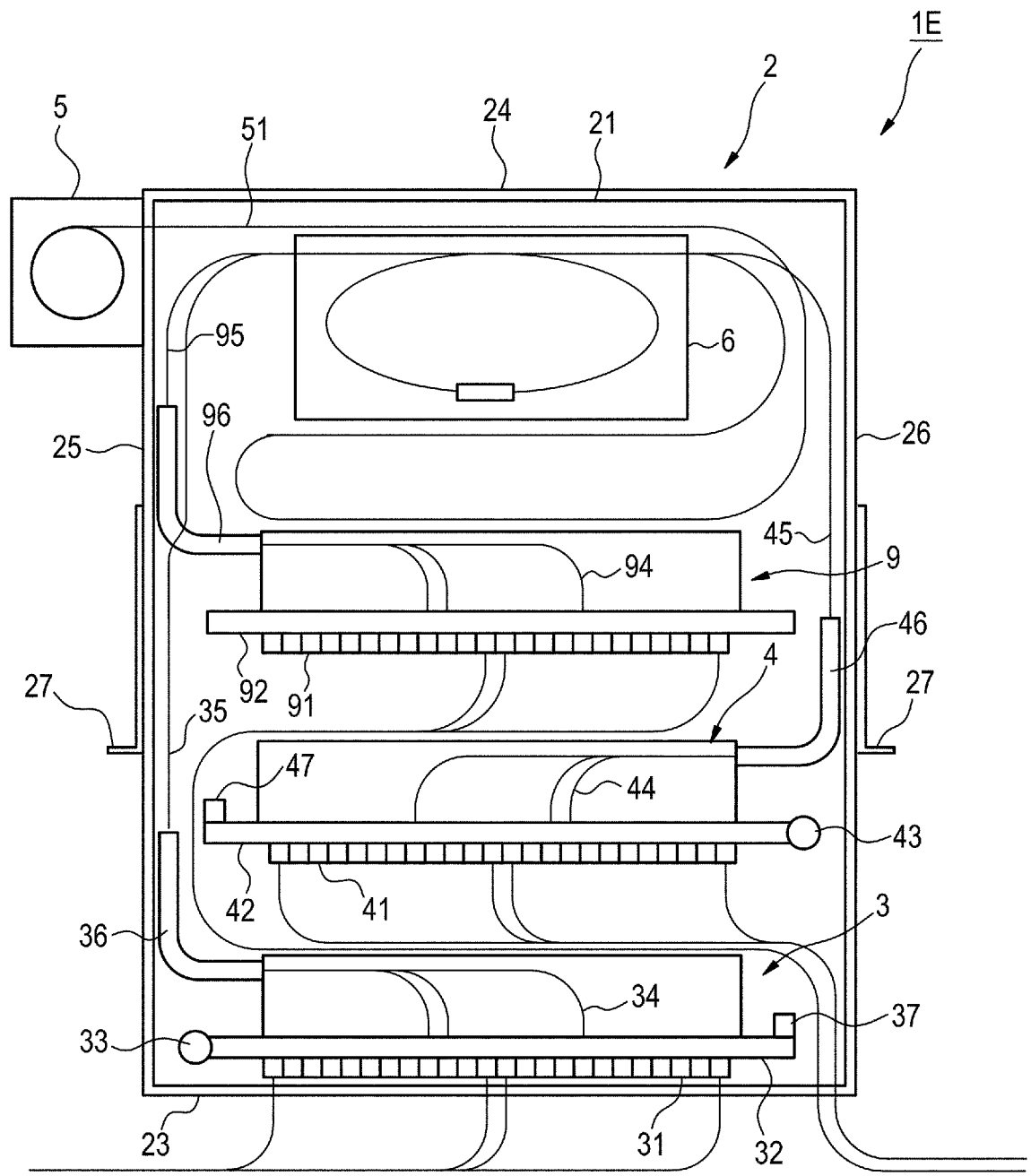
FIG. 7 is a plan view of a termination unit which includes three adapter panels.

The termination unit 1 may include a fifth adapter panel 9. FIG. 7 is a plan view illustrating the inside of a termination unit 1E including the fifth adapter panel 9. Elements that are substantially the same as those of the termination unit 1B in FIG. 3 and the termination unit 1C in FIG. 5 are denoted by the same reference numerals, and repeated descriptions thereof will be omitted.

As illustrated in FIG. 7, the fifth adapter panel 9 is disposed in the case 2 at a position closer to the back surface 24 of the case 2 than the first adapter panel 3 and the second adapter panel 4. Fifth adapter panel 9 of the present embodiment is fixed between the second adapter panel 4 and the splice tray 6. The fifth adapter panel 9 includes a plurality of fifth adapters 91 each configured so that a corresponding one of a plurality of optical connectors is connectable thereto and disconnectable therefrom, and a fifth adapter surface 92 on which the fifth adapters 91 are arranged. A plurality of cables with fifth connectors 94 are each connected to a corresponding one of the fifth adapters 91. A cable portion 95 and a protective member 96 are provided on a back surface side of the fifth adapter panel 9.

In the case 2, the first adapter surface 32, the second adapter surface 42, and the fifth adapter surface 92 are separated from each other. Further, in the present embodiment, the first adapter surface 32, the second adapter surface 42, and the fifth adapter surface 92 are configured to be capable of becoming parallel to each other. For example, as illustrated in FIG. 7, in a state in which a distance between the second adapter panel 4 and the fifth adapter panel 9 is the shortest, the second adapter surface 42 and the fifth adapter surface 92 are separated from each other and are capable of becoming parallel to each other. In a state in which the second adapter panel 4 is rotated forward so as to be away from the fifth adapter panel 9, the second adapter surface 42 and the fifth adapter surface 92 are separated from each other, and a direction of the second adapter surface 42 and a direction of the fifth adapter surface 92 can intersect each other.

In the termination unit 1E of this embodiment, the first adapter panel 3 and the second adapter panel 4 are also rotated. Therefore, a work space between the second adapter panel 4 and fifth adapter panel 9 is secured. In this embodiment, a user can connect and disconnect each of optical connectors to and from a corresponding one of the first adapters 31 of the first adapter panel 3 from the left side, and connect and disconnect each of optical connectors to and from a corresponding one of the second adapters 41 of the second adapter panel 4 from the right side. Further, the user can connect and disconnect each of optical connectors to and from a corresponding one of the fifth adapters 91 of the fifth adapter panel 9, passing around the left end of the second adapter panel 4 from the right side of the case 2.

As described above, the termination unit 1E of this embodiment includes the first adapter panel 3, the second adapter panel 4, and the fifth adapter panel 9. In other words, since the termination unit 1E includes more adapters connectable to optical connectors, the termination unit 1E can handle a larger volume of information.

Figure 8:
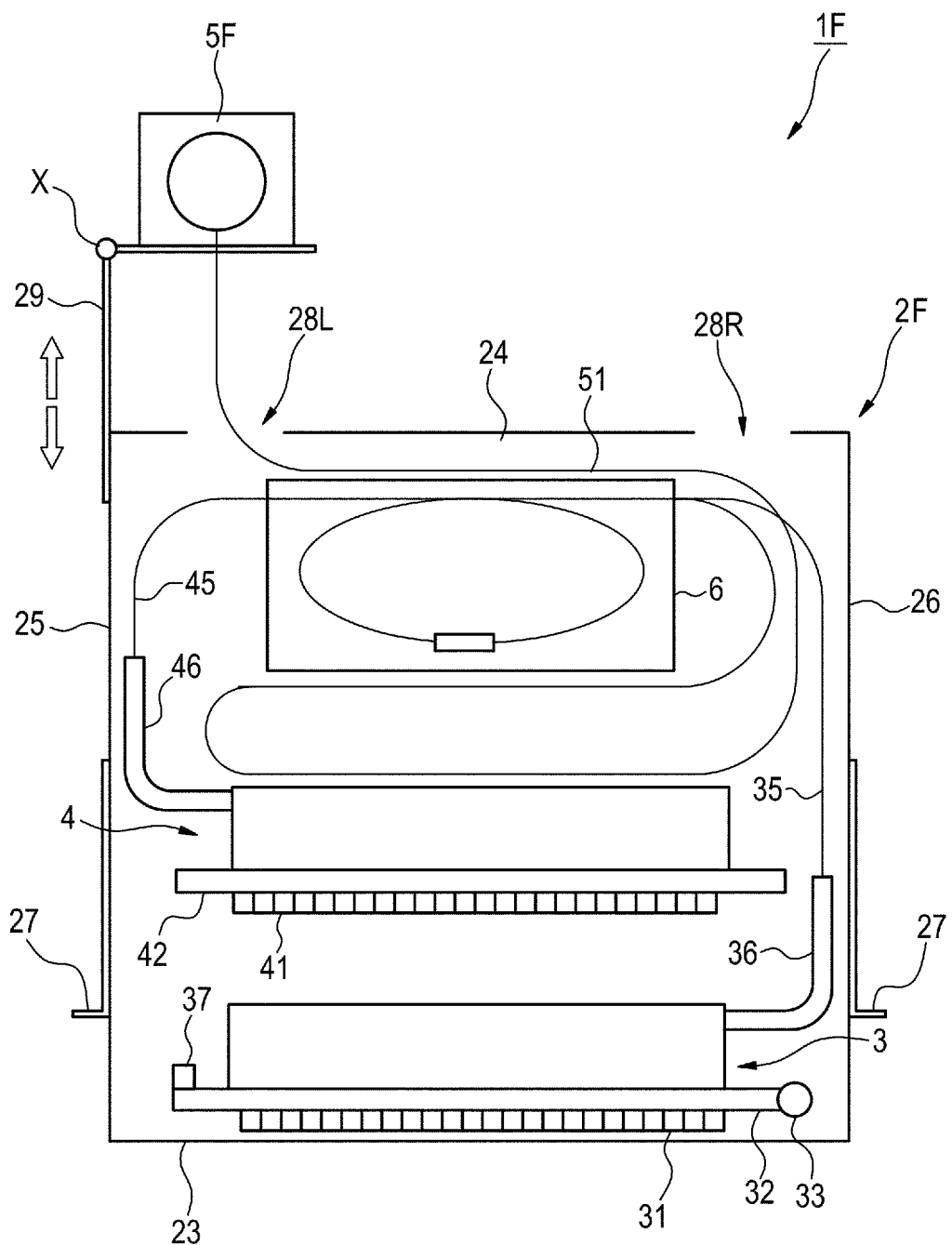
FIG. 8 is a plan view of a termination unit when a cable introducing portion of the termination unit is in a first position.
Figure 9:
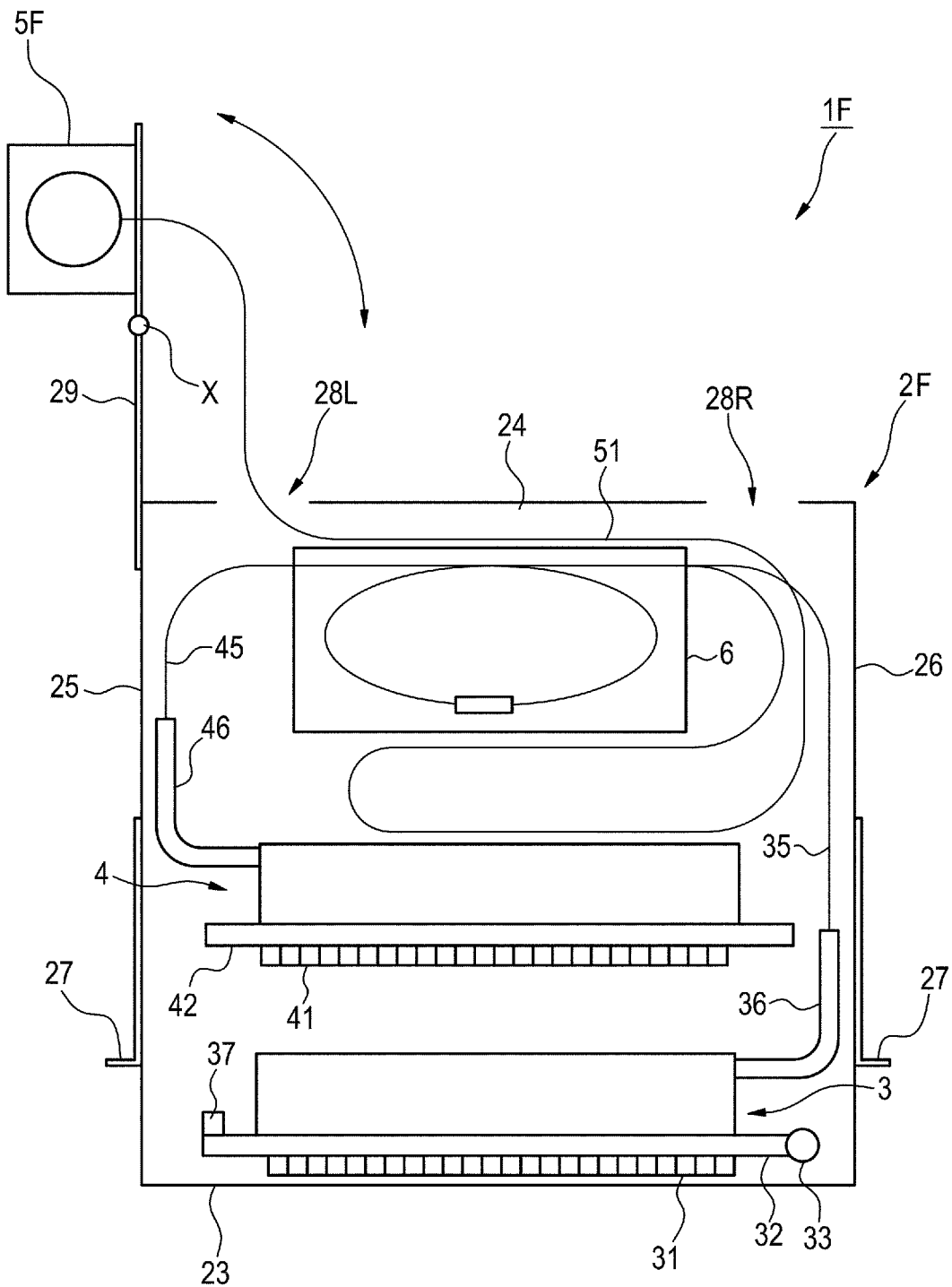
FIG. 9 is a plan view of a termination unit when a cable introducing portion of the termination unit is in a second position.

The Cable introducing portion 5 of the termination unit 1 may be configured to be movable. FIGS. 8 and 9 are plan views illustrating the inside of a termination unit 1F. FIG. 8 is a plan view of the termination unit 1F when a cable introducing portion 5F of the termination unit 1F is in a first position. FIG. 9 is a plan view of the termination unit 1F when the cable introducing portion 5F of the termination unit 1F is in a second position. Elements that are substantially the same as those of the termination unit 1 illustrated in FIG. 1 are denoted by the same reference numerals, and repeated descriptions thereof will be omitted.

As illustrated in FIGS. 8 and 9, the termination unit 1F includes a case 2F having an opening 28L and an opening 28R, the cable introducing portion 5F guiding an optical cable from the outside to the opening 28L or the opening 28R of the case 2F, and a bracket 29 supporting the cable introducing portion 5F. In this embodiment, the opening 28L and the opening 28R are disposed on the back surface 24 of the case 2F.

The Cable introducing portion 5F is attached to the bracket 29. The bracket 29 is attached to the outer surface 22 of the case 2F and has a shaft X. In other words, the cable introducing portion 5F is supported by the outer surface 22 of the case 2F via the shaft X and the bracket 29. The Cable introducing portion 5F in this embodiment is supported by the left side surface 25 of the case 2.

The Cable introducing portion 5F in this embodiment is configured to rotate around the shaft X between the first position (FIG. 8) in which the cable introducing portion 5F faces the opening 28L and the second position (FIG. 9) in which the cable introducing portion 5F is further separated from the opening 28L than in the first position. Here, the "facing" state includes not only a state in which the cable introducing portion 5F and the opening 28L face each other head-on, but also a state in which only a part of the cable introducing portion 5F faces the opening 28L, and a state in which the cable introducing portion 5F obliquely faces the opening 28L. Further, the second position is not necessarily limited to a position (FIG. 9) in which the cable introducing portion 5F is rotated by 90 degrees from the first position. When the cable introducing portion 5F is rotated by some angle around the shaft X from the first position illustrated in FIG. 8, the position can be the second position.

The bracket 29 is slidably attached to the outer surface 22 of the case 2F. Specifically, the cable introducing portion 5F attached to the bracket 29 is configured to move toward and away from the case 2F.

The optical cable 51 is guided from the cable introducing portion 5F and is housed in the case 2F. The optical cable 51 has an extra length that allows the cable introducing portion 5F to rotate and the bracket 29 to slide.

Next, a method of using the termination unit 1F will be described. It may be preferred that the cable introducing portion 5F is disposed at a position close to the opening 28L of the case 2F. For example, when the termination unit 1F is housed in an optical wiring rack, it is preferable that the entire the termination unit 1F including the cable introducing portion 5F is small. In such a case, as illustrated in FIG. 8, a user rotates the cable introducing portion 5F around the shaft X to a first position in which the cable introducing portion 5F faces the opening 28L, and houses the termination unit 1F in the optical wiring rack.

On the other hand, it may be preferred that the cable introducing portion 5F is disposed at a position far from the opening 28L of the case 2F. For example, when the optical cable 51 is guided from the outside to the splice tray 6 of the case 2F, it is preferable to expand a work space between the cable introducing portion 5F and the opening 28L of the case 2F. In such a case, as illustrated in FIG. 9, a user rotates the cable introducing portion 5F around the shaft X to the second position in which the cable introducing portion 5F is further separated from the opening 28L than in the first position, thereby securing a work space.

As described above, the cable introducing portion 5F of the present embodiment is configured to rotate around the shaft X between the first position and the second position. Therefore, a user can expand a space between the case 2F and the cable introducing portion 5F as a work space by rotating the cable introducing portion 5F between the first position and the second position as necessary. Therefore, wiring of optical cables is facilitated.

The termination unit 1F in this embodiment includes the bracket 29, and the cable introducing portion 5F is attached to the bracket 29. Therefore, by changing the size and shape of the bracket 29, the cable introducing portion 5F can be attached to the case 2F without changing the configurations of the cable introducing portion 5F and the case 2F in termination unit 1F. Therefore, flexibility of disposing the cable introducing portion 5F is increased.

The bracket 29 is slidably attached to the outer surface 22 of the case 2F. By moving the cable introducing portion 5F attached to the bracket 29 relative to the case 2F, a user can further expand the space between the case 2F and the cable introducing portion 5F as a work space. Therefore, working efficiency is improved.

The termination unit 1F may not include the bracket 29. In this case, the shaft X is a part of the outer surface 22 of the case 2 and is disposed in a part of the cable introducing portion 5F. Without the bracket 29, the cable introducing portion 5F can be rotated between the first position and the second position by disposing the shaft X in the termination unit 1F.

The bracket 29 may be fixed to the outer surface 22 of the case 2F. Even when the bracket 29 is fixed to the case 2F, by rotating the cable introducing portion 5F between the first position and the second position, the space between the case 2F and the cable introducing portion 5F is secured as a work space.

Figure 10:
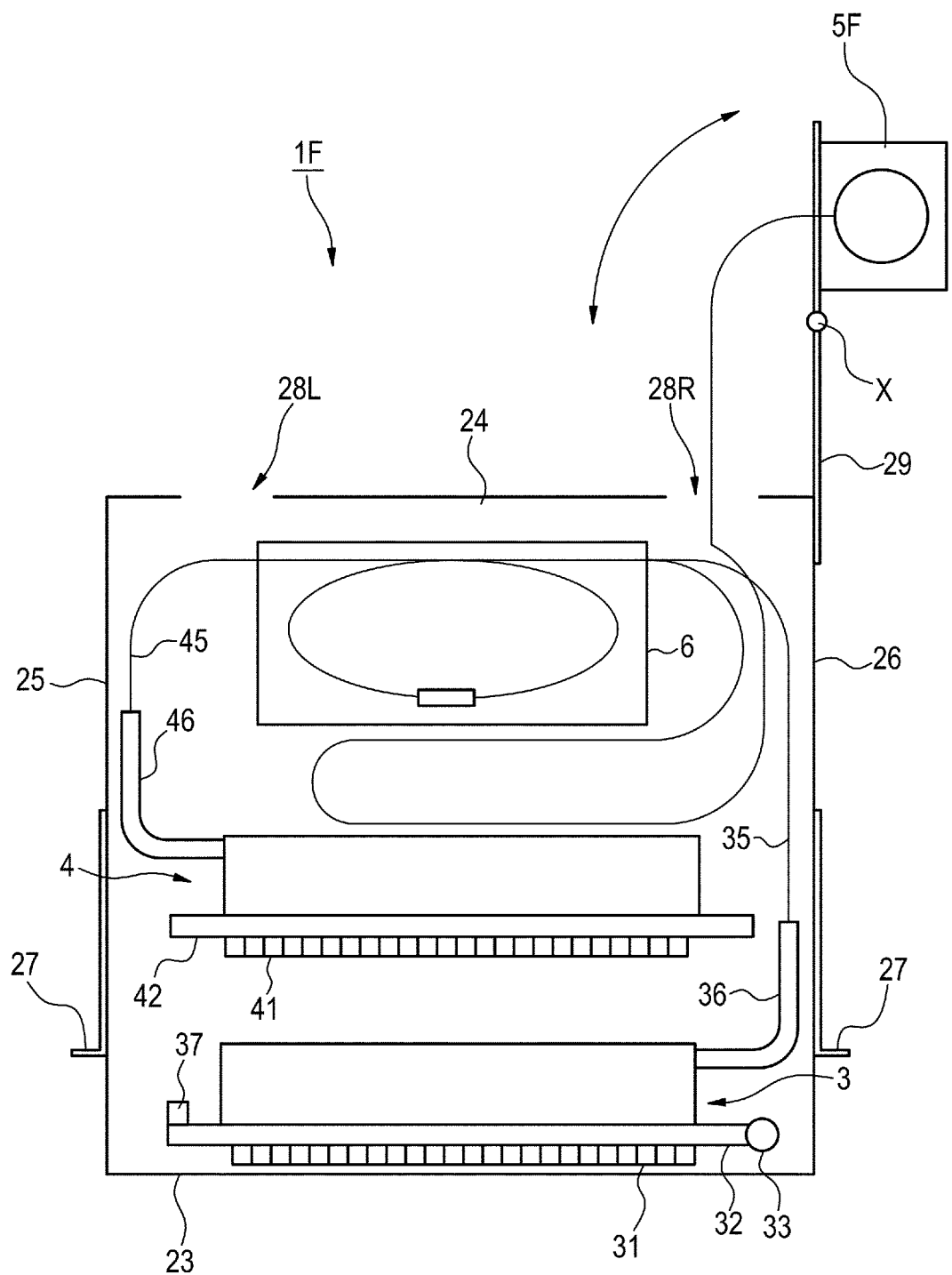
FIG. 10 is a plan view of a termination unit when a cable introducing portion is supported by a right side surface of the case of the termination unit.

The cable introducing portion 5F in this embodiment is configured to be supported by either of the left side surface 25 and the right side surface 26 of the case 2F. FIG. 8 illustrates a state in which the cable introducing portion 5F is supported by the left side surface 25 of the case 2F and guides an optical cable from the outside to the opening 28L of the case 2F. FIG. 10 illustrates a state in which the cable introducing portion 5F is supported by the right side surface 26 of the case 2F and guides an optical cable from the outside to the opening 28R of the case 2F.

The cable introducing portion 5F may be attached to the left side surface 25 of the case 2F or may be attached to the right side surface 26 of the case 2F, in accordance with a housing portion of an optical wiring rack to be mounted. Since the cable introducing portion 5F of the present embodiment is configured to be supported by both of the left side surface 25 and the right side surface 26, flexibility of disposed position of the cable introducing portion 5F with respect to the case 2F is improved, and thus convenience is improved.

Although the present disclosure has been described in detail and with reference to specific embodiments, it is clear to those skilled in the art that various changes and modifications can be made without departing from the spirit and scope of the present disclosure. In addition, the number, positions, shapes, and the like of the constituent members described above are not limited to those in the embodiments described above, and can be changed to the number, positions, shapes, and the like suitable for implementing the present disclosure.

What is claimed is:

1. An optical cable termination unit comprising:
   a case;
   a first adapter panel disposed in the case and including
      a plurality of first adapters each configured so that a corresponding one of a plurality of optical connectors is connectable thereto and disconnectable therefrom, and
      a first surface, the plurality of first adapters being arranged two-dimensionally in the first surface; and
   a second adapter panel disposed in the case and including
      a plurality of second adapters each configured so that a corresponding one of the plurality of optical connectors is connectable thereto and disconnectable therefrom, and
      a second surface, the plurality of second adapters being arranged two-dimensionally in the second surface,
   wherein the first surface and the second surface are separated from each other,
   wherein the first adapter panel is configured to be movable relative to the second adapter panel so that the first surface and the second surface are capable of becoming parallel to each other,
   wherein the first adapter panel and the second adapter panel extend along a first direction and are parallel to each other, and
   wherein the first adapter panel and the second adapter panel are arranged side by side along a second direction perpendicular to the first direction.

2. The optical cable termination unit according to claim 1,
   wherein the first adapter panel is supported by the case via a first shaft, and
   wherein the first adapter panel is configured to rotate relative to the second adapter panel around the first shaft.

3. The optical cable termination unit according to claim 1, comprising:
   a support body disposed in the case and configured to slide with respect to the case,
   wherein at least one of the first adapter panel or the second adapter panel is supported by the support body.

4. The optical cable termination unit according to claim 1,
   wherein the first adapter panel includes
      a third adapter panel including some of the plurality of first adapters, and
      a fourth adapter panel including the others of the plurality of first adapters,
   wherein the third adapter panel is supported by the case via a third shaft disposed at one end of the first adapter panel,
   wherein the third adapter panel is configured to rotate relative to the fourth adapter panel around the third shaft,
   wherein the fourth adapter panel is supported by the case via a fourth shaft disposed at the other end of the first adapter panel, and
   wherein the fourth adapter panel is configured to rotate relative to the third adapter panel around the fourth shaft.

5. The optical cable termination unit according to claim 1,
   wherein the second adapter panel is supported by the case via a second shaft, and wherein the second adapter panel is configured to rotate relative to the first adapter panel around the second shaft.

6. The optical cable termination unit according to claim 1,
   wherein a plurality of cables with first connectors are each connected to a corresponding one of the plurality of first adapters, and
   wherein a plurality of cables with second connectors are each connected to a corresponding one of the plurality of second adapters.

7. The optical cable termination unit according to claim 6,
   wherein each of the cables with the first connectors includes an optical fiber or an optical fiber ribbon,
   wherein each of the cables with the second connectors includes an optical fiber or an optical fiber ribbon,
   wherein a cable portion of the plurality of cables with the first connectors is covered with a protective member, and
   wherein a cable portion of the plurality of cables with the second connectors is covered with a protective member.

8. The optical cable termination unit according to claim 6,
   wherein each of the cables with the first connectors includes an optical fiber having an outside diameter from 200 μm to 250 μm, and
   wherein each of the cables with the second connectors includes an optical fiber having an outside diameter from 200 μm to 250 μm.

9. The optical cable termination unit according to claim 1,
   wherein an optical connector insertion/removal direction of the first adapter panel, the direction in which the plurality of optical connectors are inserted and removed from the plurality of first adapters, is perpendicular to the first surface, and
   wherein an optical connector insertion/removal direction of the second adapter panel, the direction in which the plurality of optical connectors are inserted and removed from the plurality of first adapters, is perpendicular to the second surface.

10. An optical cable termination unit comprising:
    a case having an opening;
    a first adapter panel disposed in the case and including a plurality of first adapters and a first surface, the plurality of first adapters being arranged two-dimensionally in the first surface;
    a second adapter panel disposed in the case and including a plurality of second adapters and a second surface, the plurality of second adapters being arranged two-dimensionally in the second surface; and
    a cable introducing portion configured to guide an optical cable from an outside to the opening of the case,
    wherein the cable introducing portion is supported by an outer surface of the case via a shaft and is configured to rotate around the shaft between a first position in which the cable introducing portion faces the opening and a second position in which the cable introducing portion is further separated from the opening than in the first position,
    wherein the first adapter panel and the second adapter panel extend along a first direction and are parallel to each other, and
    wherein the first adapter panel and the second adapter panel are arranged side by side along a second direction perpendicular to the first direction.

11. The optical cable termination unit according to claim 10,
wherein the outer surface includes a first side surface and a second side surface forming the case,
wherein the first side surface and the second side surface face each other and intersect a surface including the opening, and
wherein the cable introducing portion is configured to be supported by both of the first side surface and the second side surface via the shaft.

12. The optical cable termination unit according to claim 10, comprising:
a bracket attached to the outer surface of the case and including the shaft,
wherein the cable introducing portion is attached to the bracket.

13. The optical cable termination unit according to claim 12,
wherein the bracket is slidably attached to the outer surface of the case.

14. The optical cable termination unit according to claim 10,
wherein the plurality of first adapters is each configured so that a corresponding one of a plurality of optical connectors is connectable thereto and disconnectable therefrom,
wherein an optical connector insertion/removal direction of the first adapter panel, the direction in which the plurality of optical connectors are inserted and removed from the plurality of first adapters, is perpendicular to the first surface,
where the plurality of second adapters is each configured so that a corresponding one of the plurality of optical connectors is connectable thereto and disconnectable therefrom, and
wherein an optical connector insertion/removal direction of the second adapter panel, the direction in which the plurality of optical connectors are inserted and removed from the plurality of first adapters, is perpendicular to the second surface.

* * * * *